US011510191B2

(12) United States Patent
Choi et al.

(10) Patent No.: US 11,510,191 B2
(45) Date of Patent: Nov. 22, 2022

(54) DECENTRALIZED RADIO RESOURCE ALLOCATION USING A DISTRIBUTED CACHE

(71) Applicant: Cisco Technology, Inc., San Jose, CA (US)

(72) Inventors: Young Il Choi, San Jose, CA (US); Vishal S. Desai, San Jose, CA (US); Santosh B. Kulkarni, Sunnyvale, CA (US); Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 16/814,836

(22) Filed: Mar. 10, 2020

(65) Prior Publication Data
US 2021/0289493 A1    Sep. 16, 2021

(51) Int. Cl.
H04W 72/04    (2009.01)
H04W 28/16    (2009.01)
H04W 72/08    (2009.01)

(52) U.S. Cl.
CPC ....... *H04W 72/0433* (2013.01); *H04W 28/16* (2013.01); *H04W 72/0426* (2013.01); *H04W 72/085* (2013.01)

(58) Field of Classification Search
None
See application file for complete search history.

(56) References Cited

U.S. PATENT DOCUMENTS

| 7,558,208 B2 * | 7/2009 | Lin | H04W 48/20 370/235 |
| 8,194,599 B2 * | 6/2012 | Marinier | H04W 28/18 370/329 |
| 8,780,743 B2 * | 7/2014 | Sombrutzki | H04W 16/10 370/252 |
| 9,019,942 B2 * | 4/2015 | Osborn | H04W 60/00 370/338 |

(Continued)

FOREIGN PATENT DOCUMENTS

| CN | 105430660 A | 3/2016 |
| CN | 109151910 A | 1/2019 |

(Continued)

OTHER PUBLICATIONS

PCT Notification of Transmittal of the International Search Report and the Written Opinion of the International Searching Authority, or the Declaration for Application No. PCT/US2021/070257 dated Jun. 14, 2021.

(Continued)

*Primary Examiner* — Gregory B Sefcheck
(74) *Attorney, Agent, or Firm* — Patterson + Sheridan, LLP (57) ABSTRACT

A network system comprises a plurality of access points (APs) and a distributed cache. The distributed cache is formed using memory in the plurality of APs. The plurality of APs are configured to measure telemetry data and store the telemetry data in the distributed cache. One of the plurality of APs is assigned as a controller AP configured to assign, based on the telemetry data stored in the distributed cache, multiple APs of the plurality of APs to different roles to analyze the plurality of APs and update resource configurations of the plurality of APs.

20 Claims, 5 Drawing Sheets

(56) References Cited

U.S. PATENT DOCUMENTS

| | | | |
|---|---|---|---|
| 9,408,172 B2* | 8/2016 | Gupta | H04W 4/33 |
| 9,479,241 B2* | 10/2016 | Pabla | H04L 67/10 |
| 9,686,700 B2* | 6/2017 | Wang | H04W 4/06 |
| 9,730,269 B2* | 8/2017 | Iyer | H04L 12/4675 |
| 9,918,322 B2 | 3/2018 | Sharma et al. | |
| 10,021,609 B2* | 7/2018 | Lee | H04W 36/30 |
| 10,178,578 B1* | 1/2019 | McFarland | H04W 52/38 |
| 10,299,200 B2* | 5/2019 | Lin | H04W 48/20 |
| 10,356,629 B2* | 7/2019 | Gokturk | H04L 12/403 |
| 10,397,932 B2 | 8/2019 | Gonzalez Garrido et al. | |
| 10,420,155 B2* | 9/2019 | Hu | H04W 12/06 |
| 10,433,189 B2* | 10/2019 | Desai | H04W 64/003 |
| 10,499,328 B2* | 12/2019 | Allanki | H04W 48/20 |
| 10,609,574 B2* | 3/2020 | Desai | H04W 24/02 |
| 10,645,588 B2* | 5/2020 | Mahoney | H04W 16/12 |
| 10,893,418 B2* | 1/2021 | Liu | H04L 41/0806 |
| 2014/0050156 A1 | 2/2014 | Chan et al. | |
| 2014/0098748 A1 | 4/2014 | Chan et al. | |
| 2014/0185606 A1* | 7/2014 | Wei | H04L 67/288 370/350 |
| 2014/0359045 A1* | 12/2014 | Mirarchi | H04W 4/18 709/213 |
| 2014/0362807 A1* | 12/2014 | Bhatnagar | H04W 76/12 370/329 |
| 2016/0088636 A1 | 3/2016 | Zhao et al. | |
| 2016/0262163 A1 | 9/2016 | Garrido et al. | |
| 2017/0048347 A1 | 2/2017 | Trossen | |
| 2018/0232429 A1* | 8/2018 | Singh | H04W 4/02 |
| 2018/0324607 A1* | 11/2018 | Rengarajan | H04W 24/02 |
| 2019/0073701 A1* | 3/2019 | Sonnad | G06Q 20/02 |
| 2019/0132848 A1 | 5/2019 | Ansley | |
| 2019/0245917 A1* | 8/2019 | Mendiola | H04L 67/2842 |
| 2019/0342194 A1 | 11/2019 | Mermoud et al. | |
| 2019/0342795 A1* | 11/2019 | McFarland | H04W 24/08 |

FOREIGN PATENT DOCUMENTS

| | | |
|---|---|---|
| EP | 2999254 A1 | 3/2016 |
| EP | 3059992 A1 | 8/2016 |
| EP | 3132594 A1 | 2/2017 |
| EP | 3425948 A1 | 1/2019 |
| ES | 2458621 A1 | 5/2014 |
| WO | 2015055871 A1 | 4/2015 |
| WO | 2015160969 A1 | 10/2015 |

OTHER PUBLICATIONS

Ziyan Wu et al., "QaMeC: A QoS-driven IoVs application optimizing deployment scheme in multimedia edge clouds," Future Generation Computer Systems, vol. 92, Sep. 24, 2018 (Sep. 24, 2018), pp. 17-28.

H. Kauser and S. S. Chaudhari, "Dynamic priority-based resource allocation policy for mixed traffic in long term evolution network," 2016 IEEE International Conference on Recent Trends in Electronics, Information & Communication Technology (RTEICT), Bangalore, 2016, pp. 778-782. [Abstract Only].

* cited by examiner

DECENTRALIZED RADIO RESOURCE ALLOCATION USING A DISTRIBUTED CACHE

TECHNICAL FIELD

Embodiments presented in this disclosure generally relate to configuring access points in a network. More specifically, embodiments disclosed herein describe configuring the operating parameters for access points using a decentralized system.

BACKGROUND

A radio resource management (RRM) system optimizes the operating parameters of access points (APs) and corresponding wireless networks. In many instances, the RRM system collects telemetry data from each of the APs managed by the RRM system. The RRM system utilizes the telemetry data to optimize the operating parameters of the APs managed by the RRM system. For example, the RRM system may alter the channels, channel bandwidth and/or transmission power of the APs to reduced interference between the APs.

The RRM system is either a centralized system or a decentralized system. In instances where the RRM system is a centralized system, the RRM system optimizes the operating parameters for each AP managed by the RRM system to improve the performance of the entire corresponding wireless network. However, centralized RRM systems are processor limited such that when the processor or processors that complete the RRM functions have limited resources, AP optimizations cannot be made across the entire wireless network. Accordingly, the wireless network will function sub-optimally.

In instances where the RRM system is a distributed system, the RRM system optimizes each AP individually without taking in consideration the entire wireless network. However, optimizing each AP individually often generates a sub-optimal overall wireless network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure comprises a network system comprising a plurality of access points (APs) and a distributed cache. The distributed cache is formed using memory in the plurality of APs. The plurality of APs are configured to measure telemetry data and store the telemetry data in the distributed cache. One of the plurality of APs is assigned as a controller AP configured to assign, based on the telemetry data stored in the distributed cache, multiple APs of the plurality of APs to different roles to analyze the plurality of APs and update resource configurations of the plurality of APs.

One embodiment presented in this disclosure comprises a method for assigning radio resources to a plurality of APs. The method comprises storing telemetry data measured by each of the plurality of APs in a distributed cache. The distributed cache is formed using memory in each of the plurality of APs. The method further comprises selecting, using the plurality of APs, one of the plurality of APs as a controller AP. Further, the method comprises assigning, based on the telemetry data stored in the distributed cache, multiple APs of the plurality of APs different roles to analyze the plurality of APs and update resource configurations of the plurality of APs.

One embodiment presented in this disclosure comprises an AP configured to measure telemetry data and store the telemetry data in a distributed cache formed using memory in a plurality APs, and select a first one of a plurality of APs as a controller AP. The controller AP is configured to assign, based on the telemetry data stored in the distributed cache, multiple APs of the plurality of APs to different roles to analyze the plurality of APs and update resource configurations of the plurality of APs.

EXAMPLE EMBODIMENTS

A distributed radio resource management (RRM) system may be utilized to optimize the operating parameters of a plurality of access points (APs) within a wireless network. For example, different RRM functions may be assigned to different ones of the APs to determine the radio resource requirements of each AP and to optimize the operating parameters for the AP based on the radio resource requirements to optimize the performance of the entire corresponding wireless network. The APs store telemetry data within a distributed cache formed from the memories of the APs. Distributing the RRM system across various APs, shares the processing load to determine the optimized operating parameters over the different processors of the APs, increasing the efficiency in which the optimized operating parameters are determined and assigned.

Figure 1:
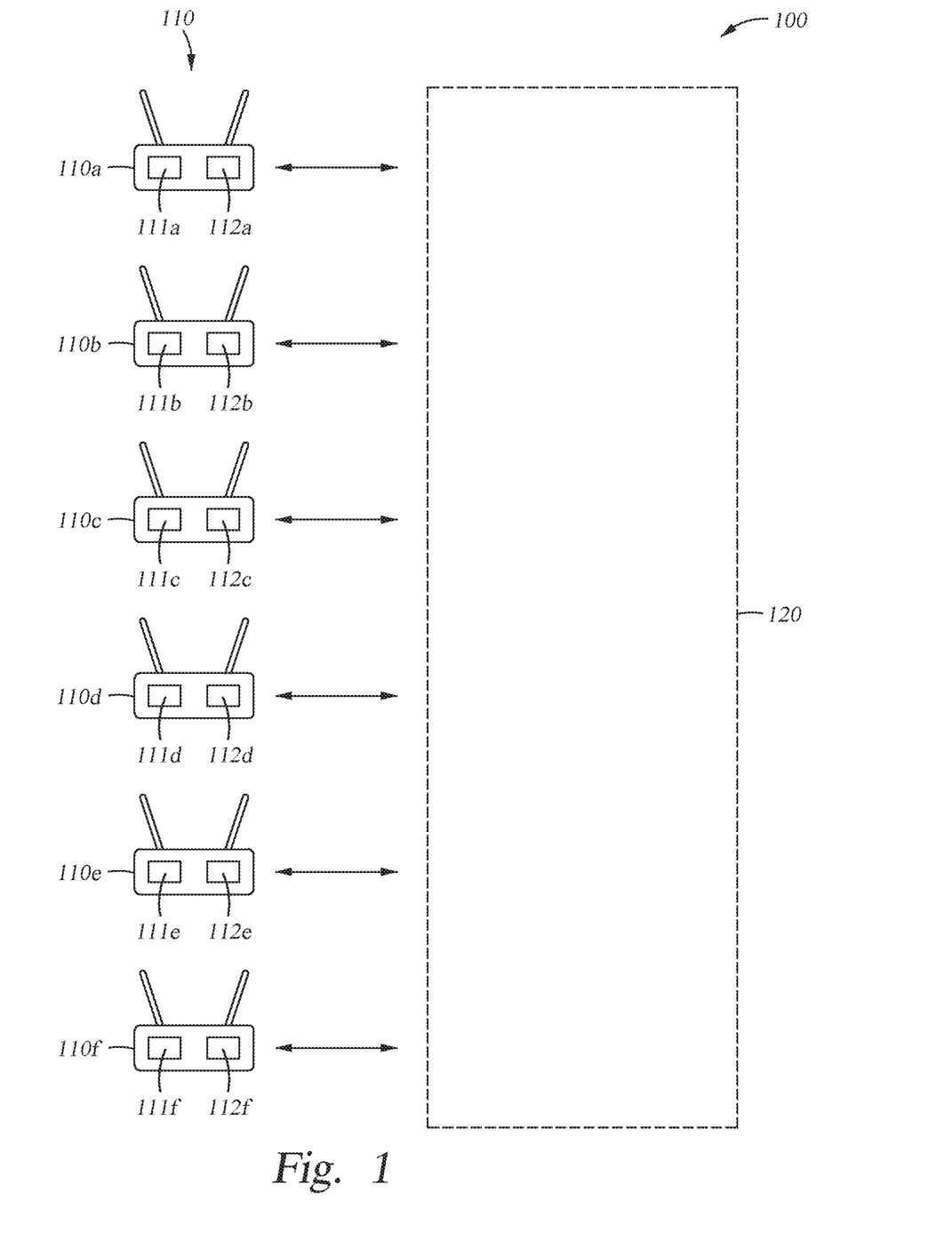
FIG. 1 illustrates a plurality of access points (APs) and a distributed cache, according to one or more embodiments.

FIG. 1 illustrates a network system 100, according to one or more embodiments. The network system 100 includes a plurality of APs 110 and a distributed cache 120. In various embodiments, the APs 110 of the network system 100 provide access to a wireless local area network (WLAN). For example, each of the APs 110 is an access device comprising one or more radios and interfaces between a communications medium (e.g., a WLAN controller) and wireless client devices (e.g., stations).

Each of the APs 110 comprises a memory 111 and a processor 112. For example, the AP 110a comprises the memory 111a and the processor 112a, the AP 110b comprises the memory 111b and the processor 112b, and the AP 110c comprises the memory 111c and the processor 112c. Further, the AP 110d comprises the memory 111d and the processor 112d, the AP 110e comprises the memory 111e and the processor 112e, and the AP 110f comprises the memory 111f and the processor 112f. The capabilities of each processor 112 may be the same. For example, each of the processors 112 may have the same processing capabilities (e.g., processor speed, number of processing cores, etc.). Alternatively, one or more of the processors 112 may have different processing capabilities from another one or more of the processors 112. For example, one or more of the processors 112 may have higher processing capabilities than another one or more of the processors 112. Further, each of the memories 111 may be the same. Alternatively, one or more of the memories 111 may differ from another one or more of the memories 111. For example, one or more of the memories 111 may be larger in size than another one or more of the memories 111.

The distributed cache 120 is formed from the memories 111 of the APs 110. For example, a portion of each of the memories 111 may be utilized to form the distributed cache 120. The portion of each of the memories 111 utilized to form the distributed cache 120 may be the same or different in size. That is, 5% of the capacity of the memory 111a may be dedicated to the distributed cache 120 while only 2% of the capacity of the memory 111b is dedicated to the distributed cache 120. Further, the distributed cache 120 is accessible by each of the APs 110. For example, the APs 110 may transmit data to the distributed cache 120 to be stored within the distributed cache 120 and read data from the distributed cache 120. The APs 110 transmit telemetry data to the distributed cache 120 and access the telemetry data from the distributed cache 120. The telemetry data may include one or more of interference information, neighbor device information, load information, radar information, client statistics, radio statistics, capacity, client type, traffic amount, traffic type, platform capability, memory capabilities, and processor capabilities, among others. The APs 110 may acquire and update telemetry data periodically at a preset period. Further, the APs 110 communicate the telemetry data to the distributed cache 120 periodically at a preset period. In one or more embodiments, one or more of the APs 110 instructs the other APs 110 to acquire corresponding telemetry data and to communicate the telemetry data to the distributed cache 120. In one embodiment, the APs 110 may access the distributed cache 120 in parallel or in series.

Figure 2:
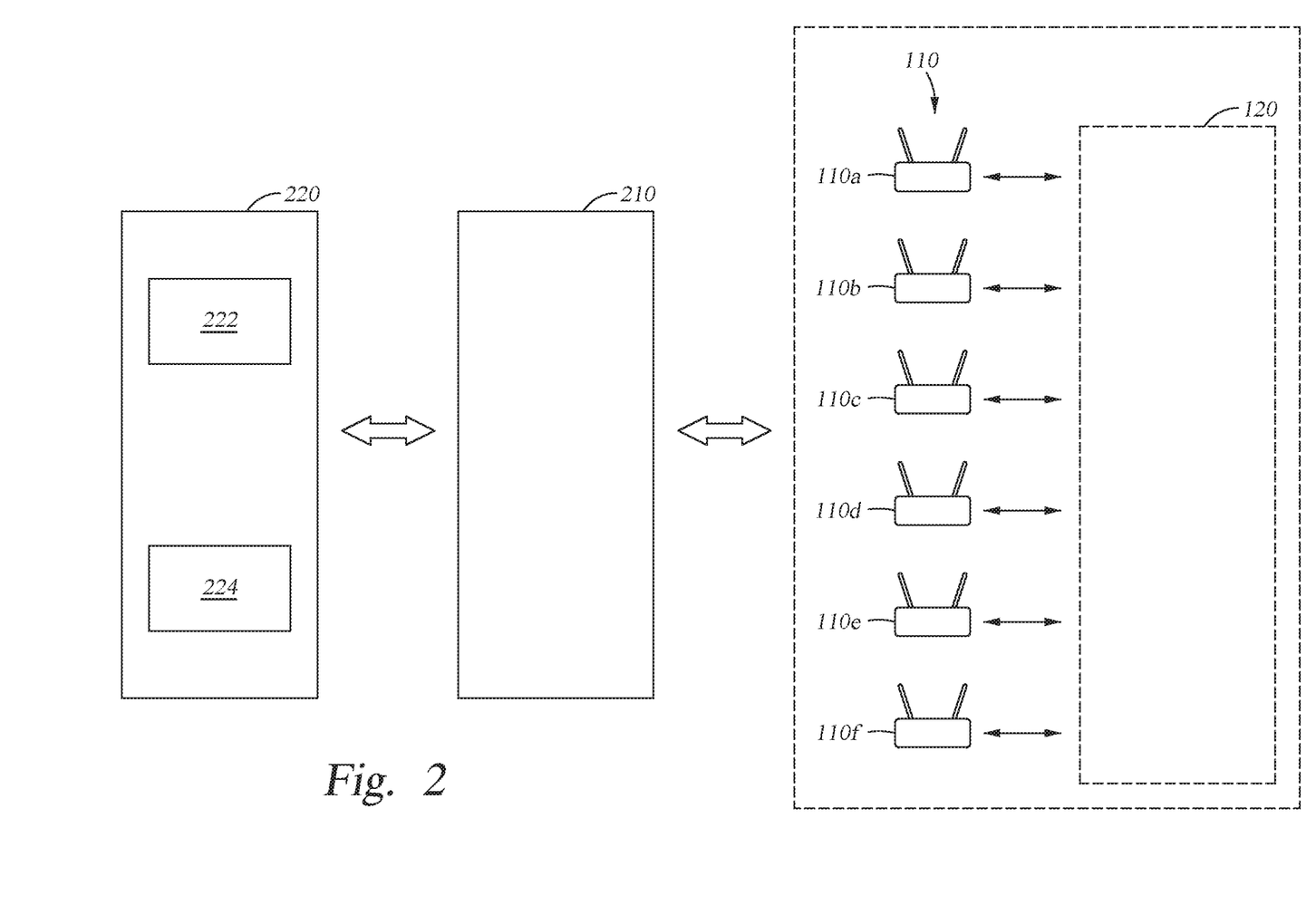
FIG. 2 illustrates a wireless network system, according to one or more embodiments.

With reference to FIG. 2, each of the APs 110 is connected to the network controller 210. The network controller 210 may include one or more processors and a memory. The memory includes instructions that may be executed by the one or more processors to cause the one or more processors to control the APs 110. For example, the network controller 210 controls the operating parameters of the APs 110. Controlling the operating parameters of the APs 110 may comprise assigning one or more of a channel, channel bandwidth, and transmission power, among others, to each of the APs 110.

In one or more embodiments, the network controller 210 instructs the APs 110 to acquire telemetry data. Further, the network controller 210 instructs the APs 110 to communicate the telemetry data to the distributed cache 120.

In various embodiments, the network controller 210 is connected to the cloud computing system 220. The cloud computing system 220 includes one or more controllers 222.

The cloud computing system 220 may instruct the network controller 210 to control the APs 110. For example, the cloud computing system 220 may instruct the network controller 210 to assign operating parameters to each of the APs 110. Further, the cloud computing system 220 may instruct the network controller 210 to instruct one or more of the APs 110 to acquire telemetry data. In one or embodiments, the cloud computing system 220 may include an RRM component 224 configure to control the operating parameters of the APs 110. In such embodiment, the cloud computing system 220 monitors the processor load of the RRM component 224 and may instruct the APs 110 to initiate the distribution of one or more RRM functions as described with regard to method 500 of FIG. 5. For example, the cloud computing system 220 may detect that the processor load of the RRM component 224 is high such that the RRM component 224 is not able to assign operation parameters to the APs 110 to optimize the performance of the corresponding WLAN. Accordingly, the cloud computing system 220 instructs the APs 110 to distribute one or more RRM function among the APs 110. Further, the cloud computing system 220 may instruct the APs to form the distributed cache 120 and store telemetry data in the distributed cache 120.

Figure 3:
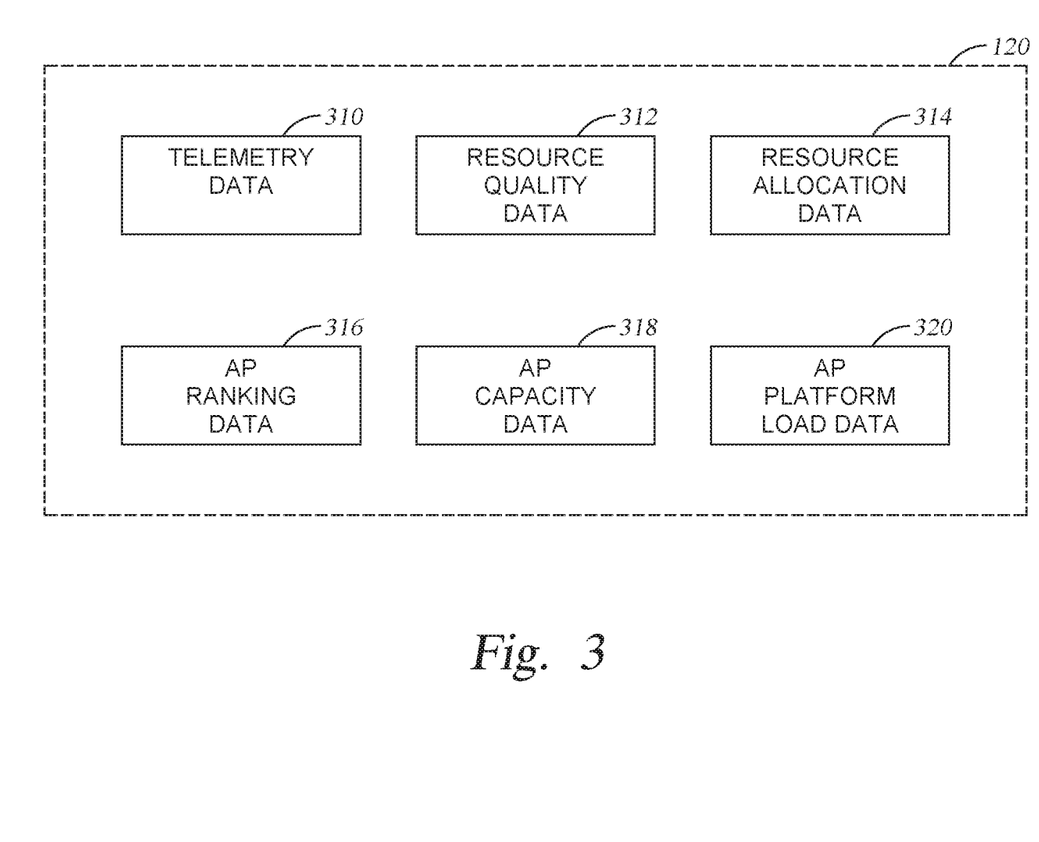
FIG. 3 illustrates a distributed cache, according to one or more embodiments.

FIG. 3 illustrates a block diagram of the distributed cache 120, according to one or more embodiments. The distributed cache 120 provides a memory space accessible by each of the APs 110 such that telemetry data of one AP (e.g., the AP 110a) is accessible by another AP (e.g., the AP 110b). Accordingly, as will be described with more detail with regard to FIGS. 4-6, each of the APs 110 is able to access the data stored within the distributed cache 120 and store processed data with the distributed cache 120 such that RRM functions may be decentralized and assigned to different ones of the APs 110. The distributed cache 120 includes telemetry data 310, resource quality data 312, resource allocation data 314, AP ranking data 316, AP capacity data 318, and AP platform data 320. The telemetry data 310 includes the telemetry data for each of the APs 110. The resource quality data 312 includes data corresponding to the quality of the radio resources for each of the APs 110. The resource allocation data 314 incudes data corresponding to the allocation of resources (e.g., channel, transmission power, etc.) for each of the APs 110. The AP ranking data 316 includes data corresponding to a needs assessment of each AP 110 and an indication as to the amount that each AP 110 contributes to the throughput and quality of a corresponding wireless network. The AP capacity data 318 corresponds to the total number of client connections supported, memory capabilities, processor capabilities, and/or client traffic for each of the APs 110. The AP platform data 320 corresponds to the amount of available processor capabilities and the amount of available memory capabilities.

Figure 4:
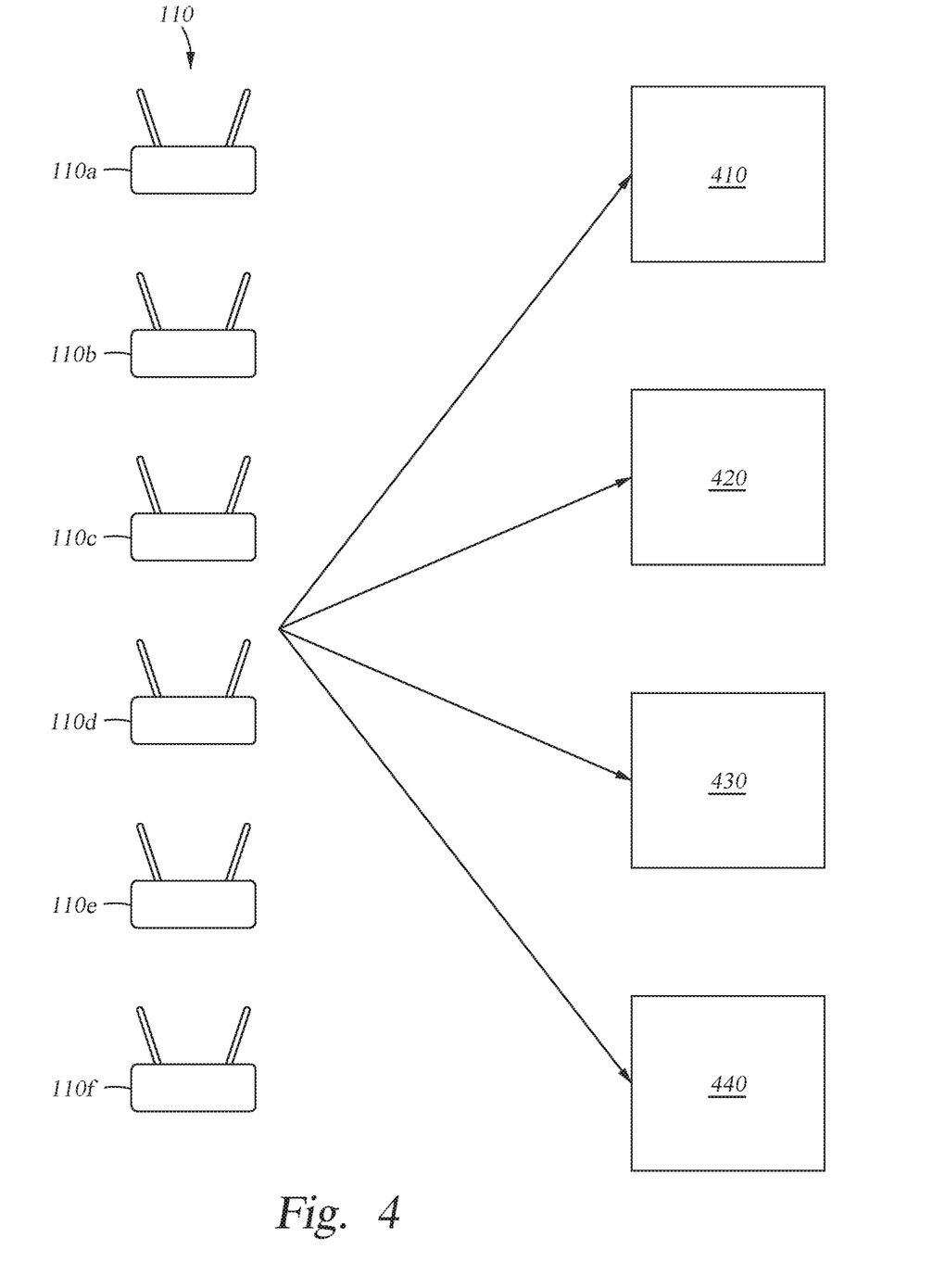
FIG. 4 illustrates the various AP roles in a decentralized system, according to one or more embodiments.

In various embodiments, the APs 110 may be assigned different roles of a distributed system having different tasks to allocate resources of the APs 110. For example, a first one of the APs 110 may be assigned as a controller AP 410. In one embodiment, the AP of the APs 110 having the highest media access control (MAC) address is selected as the controller AP 410. The controller AP 410 may be selected by the APs 110 automatically based on the MAC addresses. Alternatively, the AP of the APs 110 having the highest available processor capabilities and/or highest available memory capabilities may be selected as the controller AP 410. In one embodiment, the network controller 210 selects one of the APs 110 to function as the controller AP 410. In another embodiment, the cloud computing system 220 selects one of the APs 110 to function as the controller AP 410. The controller AP 410 assigns different roles to the available APs based on different factors of the APs. For example, the controller AP 410 may assign different roles to the available APs based on the available processing and memory capabilities of each available AP. The available APs includes the APs not assigned another role. Further available processing capabilities and available memory capabilities corresponds to processing capabilities and memory capabilities that are not being utilized to complete other tasks.

One of the available APs 110 is selected as a ranker AP 420. The ranker AP 420 may be selected from the APs 110 based on the available processor capabilities and/or memory capabilities of the available APs 110. In one embodiment, the controller AP 410 analyses the telemetry data 310 to determine the available processor capabilities and/or memory capabilities of the available APs and selects an AP to be the ranker AP 420 based on the available processor capabilities and/or memory capabilities of the available APs 110. The available processor capabilities and memory capabilities corresponds to the processor and/or memory capabilities not currently being used for other tasks. In one embodiment, the network controller 210 selects the ranker AP 420 from the available APs 110 based on the available processor capabilities and/or memory capabilities of the APs 110. Alternatively, the cloud computing system 220 selects the ranker AP 420 from the available APs 110 based on the available processor capabilities and/or memory capabilities for the APs 110.

One of the available APs 110 is selected as a resource manager AP 430. The resource manager AP 430 may be selected from the available APs 110 based on the available processor capabilities and/or memory capabilities of the APs 110. In one or more embodiments, the controller AP 410 analyzes the telemetry data 310 and selects the resource manager AP 430 from the available APs 110 based on the available processor capabilities and/or memory capabilities of the APs 110. In another embodiment, the network controller 210 selects the resource manager AP 430 from the available APs 110 based on the available processor capabilities and/or memory capabilities of the APs 110. Alternatively, the cloud computing system 220 selects the resource manager AP 430 from the available APs 110 based on the processor capabilities and/or memory capabilities of the APs 110.

One or more calculator APs 440 is selected from the available APs 110. In one embodiment, a single calculator AP 440 is selected from the available APs 110. In other embodiments, two or more calculator APs 440 are selected from the available APs 110. The calculator APs 440 may be selected from the available APs 110 based on the available processor capabilities and/or memory capabilities of the APs 110. In one embodiment, the controller AP 410 analyzes the telemetry data 310 and selects the calculator APs 440 from the available APs 110 based on the processor capabilities and/or memory capabilities of the available APs 110. In another embodiment, the network controller 210 selects the calculator APs 440 from the available APs 110. Alternatively, the cloud computing system 220 selects the calculator APs 440 from the available APs 110.

The controller AP 410 controls the ranker AP 420, the resource manager AP 430, and the calculator AP or APs 440 to complete the functions assigned to each AP. In various embodiments, the ranker AP 420, the resource manager AP 430, and the calculator AP, or APs, 440 communicate with the distributed cache 120 to access telemetry data stored by each of the APs 110 and to store data in the distributed cache 120.

The ranker AP 420 is configured to rank (or prioritize) each the APs 110 based on a radio resource requirement assessment of each AP and a network throughput quality contribution score of each AP 110.

The resource manager AP 430 is configured to determine radio resource information by measuring the amount of radio resources that will be distributed to each AP. The amount of radio resources that will be distributed to each AP 110 may be determined based on the telemetry data 310 provided by each of the APs 110.

The calculator APs 440 perform one or more of RRM functions, channel calculations, transmission power calculations, and radio role calculations. In one embodiment, a single calculator AP 440 is configured to perform the RRM functions, the channel calculations, the transmission power calculations, and the radio role calculations, among others. Alternatively, a first calculator AP 440 may be configured to perform a first one or more of the RRM functions, channel calculations, transmission power calculations, and radio role calculations and a second calculator AP 440 may be configured to perform a second one or more of the RRM functions, channel calculations, transmission power calculations, and radio role calculations. Further, in one or more embodiments, multiple calculator APs 440 may be selected and each calculator AP 440 is assigned to perform a different one of the RRM functions, the channel calculations, the transmission power calculations, and the radio role calculations. Additionally, the calculator AP or APs 440 assign the network resources to each of the APs 110 based on the rankings determined by the ranker AP 420.

Figure 5:
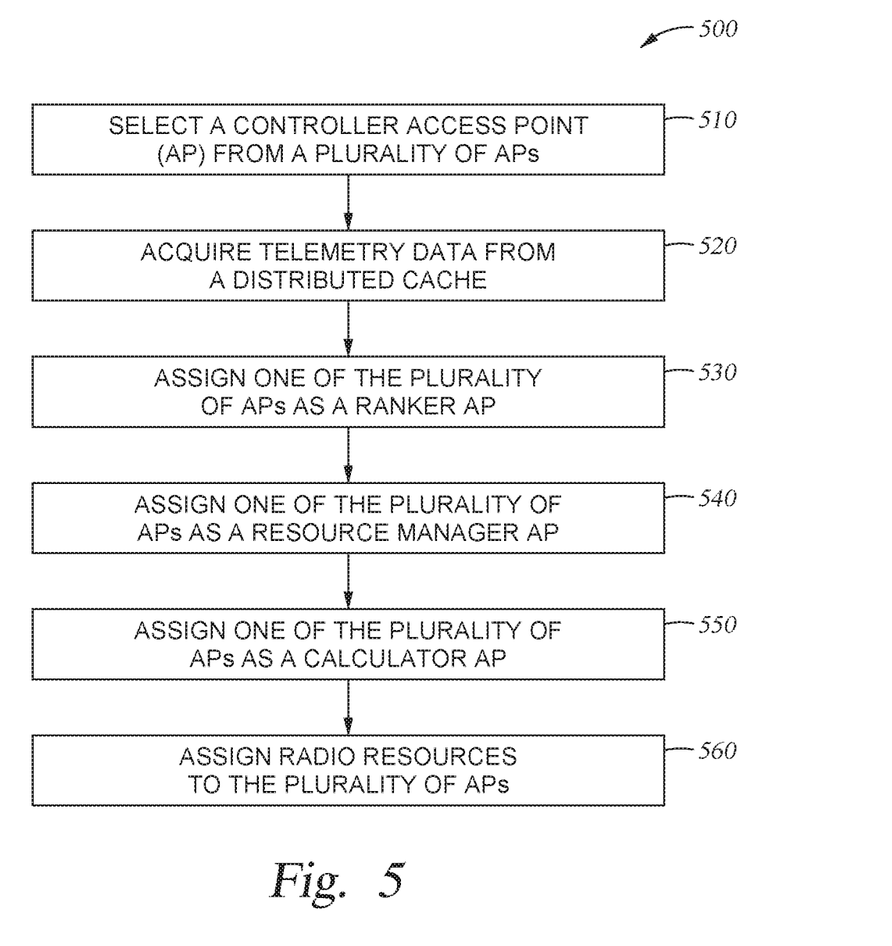
FIG. 5 is a flowchart of a method for optimizing the operating parameters of APs, according to one or more embodiments.

FIG. 5 illustrates a flowchart of a method 500 for assigning resources to a plurality of APs (e.g., the APs 110), according to one or more embodiments. At operation 510, the controller AP 410 is selected from the APs 110. For example, in one embodiment, the AP of the APs 110 having the highest MAC address is selected as the controller AP 410 by the APs 110. The AP having the highest MAC address may be automatically selected. In one embodiment, the AP 110a is selected as the controller AP 410. For example, the AP 110a may have the highest MAC address and thus is selected as the controller AP 410.

At operation 520, the controller AP 410 reads the telemetry data 310 corresponding the APs 110 from the distributed cache 120. For example, each of the APs 110 may store telemetry data 310 in the distributed cache 120 periodically or based on instructions received from the network controller 210, the cloud computing system 220, and/or the controller AP 410. Accordingly, the telemetry data 310 is accessed by the controller AP 410.

At operation 530, the controller AP 410 assigns one of the APs 110 as the ranker AP 420. For example, the controller AP 410 determines available processor resource capabilities and/or memory resource capabilities from the telemetry data 310. Further, the controller AP 410 assigns one of the available APs as the ranker AP 420 based on available processor resource capabilities and/or memory resource capabilities determined from the telemetry data 310. For example the controller AP 410 selects one of the APs 110 not currently assigned another role and having the highest amount of available processor resource capabilities and/or memory resource capabilities as the ranker AP 420.

The ranker AP 420 is configured to rank the APs 110 based on a needs assessment of each AP 110 and a network throughput quality contribution score for each AP 110. For example as illustrated by the method 600 of FIG. 6, at operation 610 each AP 110 determines a corresponding resource requirement to determine a corresponding needs assessment. For example, each AP 110 determines a corresponding resource requirement based on the supported channel bandwidth, associated client's bandwidth requirement, radar tolerance, latency sensitivity, and a ratio of data rate versus signal strength from one or more of the telemetry data 310, the resource quality data 312, the resource allocation data 314, the AP capacity data 318, and the AP platform data 320.

Figure 6:
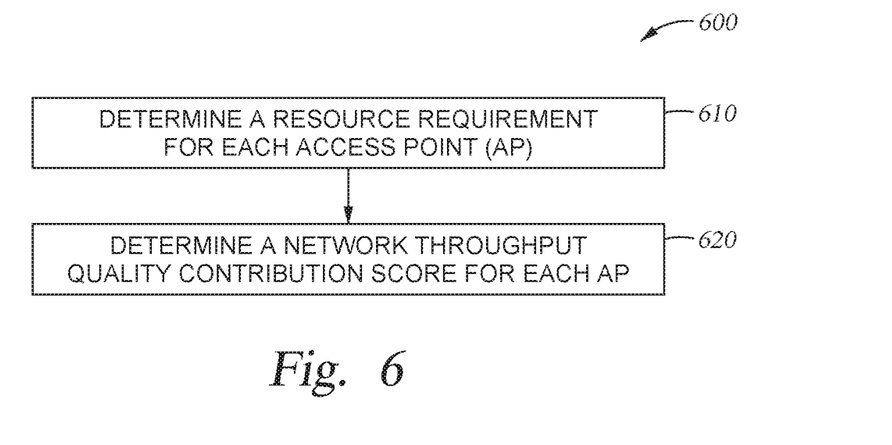
FIG. 6 is a flowchart for determining the operating parameters of APs, according to one or more embodiments.

The supported channel bandwidth may be determined from the wireless protocols supported by each AP. For example, the wireless protocols may be 802.11b protocols, 802.11A protocols, 802.11n protocols, 802.11g protocols, and 802.11ax protocols. Each of the APs 110 may support one or more of the wireless protocols. Further, each of the APs 110 determines a corresponding supported channel bandwidth from corresponding AP platform data 320 within the distributed cache 120.

Each AP 110 determines a corresponding associated client bandwidth based on the bandwidth requirements of the types of clients coupled to each AP from the AP capacity data 318. For example, the associated client bandwidth for each AP may be calculated based the number of low bandwidth (e.g., 20 MHz) client devices, medium bandwidth (e.g., 40 MHz) client devices, and high bandwidth (e.g., at least 80 MHz) client devices coupled to each AP. An AP having a higher number of connected high bandwidth clients has a higher associated bandwidth than an AP having a smaller number of connected high bandwidth clients. Further, the associated bandwidth increases as the number high and/or medium bandwidth client devices increases. With reference to FIG. 1, in one embodiment, the AP 110d may be connected to more high bandwidth client devices and less low bandwidth client devices than the AP 110e. Accordingly, the AP 110d has a higher associated client bandwidth than that of the AP 110e.

Determining the resource requirement for each AP further comprises determining whether or not an AP 110 is radar tolerant from the telemetry data 310, the resource allocation data 314 and/or the AP capacity data 318. For example, in one or more embodiment a determination is made whether or not the client devices connected to an AP utilize radar signals to communicate with the AP. If none of the client devices coupled to an AP support the use of radar signals then non-radar channels are needed by the corresponding AP. Accordingly, the AP is indicated as not being radar tolerant. However, if one or more of the client devices coupled to an AP supports the use of radar signals then the AP is radar tolerant and radar supporting channels are to be assigned to the AP.

Further, determining the resource requirement for each AP may also include determining a latency sensitivity of an AP. The latency sensitivity for an AP corresponds to the latency sensitivity of the clients coupled to an AP. In one embodiment the latency sensitivity may be determined from the telemetry data 310 and the AP capacity data 318 for each AP. Latency sensitive clients include voice and/or video streaming clients. Non-latency sensitive clients include web browsing clients and internet of things (IoT) clients, among others. An AP that is coupled to one or more latency sensitive clients may be determined as being latency sensitive. Alternatively, an AP that is coupled to more latency sensitive devices than non-latency sensitive devices may be determined as being latency sensitive.

Additionally, determining the resource requirement for each AP further comprises determining the data rate versus signal strength of the client devices coupled to each AP. Each AP may determine an associated data rate from one or more of the corresponding telemetry data 310, the resource quality data 312, and the AP capacity data 318. The data rate for an AP corresponds to the speed that data is transferred to client devices. Further, the signal strength for an AP corresponds to the connection strength between an AP and a client device. A transmission power and bandwidth requirement for each AP is determined from a corresponding data rate and signal strength. A high data rate corresponds to a high bandwidth requirement and a low data corresponds to a low bandwidth requirement. Further, a strong signal strength corresponds to a low transmission power and a low signal strength corresponds to a high transmission power. Increasing the transmission power may account for low signal strength and improve the connection between AP and corresponding client devices. In one embodiment, the transmission power may be set to be high and the bandwidth requirement may be set to be low for an AP determined to have a low data rate and a low signal strength. Alternatively, if an AP is determined to have a high data rate and a high signal strength (e.g., a strong connection to the connected client devices), the transmission power for the AP requirement may be set to low and bandwidth requirement for the AP may be set to high. Further, as the data rate for an AP increases, the bandwidth requirement of the AP increases. Additionally, as the signal strength from a client device decreases, the transmission power requirement increases.

At operation 620, a network throughput quality contribution score is determined for each AP 110. The network throughput quality contribution score is based on radio capability and a processor capability of each AP. For example, the network throughput quality contribution score is based on the amount that each AP contributes the throughput of the corresponding network (e.g., the wireless network corresponding to the network controller 210). In one or more embodiment, the score is based on the capability of the radio of each AP 110, the capabilities of the processor 112 of each AP 110, and the capabilities of the memory 111 of each AP 110. For example, an AP having a high capability radio, a high processor capabilities and/or high memory capabilities, is assigned a high score. Accordingly, the AP will be assigned more network resources to increase the corresponding contribution to the network, increasing the quality of the network.

The ranker AP 420 ranks each of the APs based on at least one of the needs assessment of each AP 110 and the network through quality contribution score for each AP 110. For example, the ranker AP 420 ranks APs that support 11ax and/or 11ac protocols higher than APs that don't support 11ax and/or 11ac and support 11a/b/g/n protocols. Further, the ranker AP 420 ranks APs that have 5G cellular capacity higher than APs that do not have cellular capacity. Additionally, or alternatively, the ranker AP 420 ranks APs based on the amount of non-latency clients that are connected to each AP. For example, APs that are connected to more non-latency clients than other APs will be ranked higher. Further, the ranker AP 420 ranks higher capacity (e.g., more available processor and/or memory capabilities) higher than APs having lower capacity (e.g., less available processor and/or memory capabilities). The ranking is stored within the AP ranking data 316.

Returning to FIG. 5, at operation 540 the controller AP 410 assigns an available AP as a resource manager AP 430. For example, the controller AP 410 assigns an available AP as the resource manager AP 430 based on the available processor capabilities and memory capabilities. In one embodiment, the controller AP 410 selects an available AP having the highest amount of available processor capabilities and/or memory capabilities as the resource manager AP 430. For example, the controller AP 410 assigns the AP 110c as the resource manager AP 430 based on the available processor capabilities and memory capabilities. The resource manager AP 430 determines the network resources that will be distributed to each AP 110. For example, the resource manager AP 430 accesses the telemetry data 310 stored within the distributed cache 120 and determines the network resources that will be distributed to each AP 110 based on the telemetry data 310. In one embodiment, the resource manager AP 430 generates a score for each channel for each AP 110. The scores may be generated based on the interference information of the telemetry data 310 stored within the distributed cache 120. The score corresponds to the amount of interference that each channel experiences. In one embodiment, the score may be on a 0 to 100 scale, where a channel that is free from interference will be given a score of 100 and a channel that is not available due to interference is given a score of 0. Further, scores of between 0 and 100 correspond to a gradual decrease in interference from a channel not being available due to interference (e.g., a score of 0) and a channel being free from interference (e.g., a score of 100). The resource manager AP 430 stores the scores for each channel for each AP in the resource allocation data 314 of the distributed cache 120.

At operation 550 the controller AP 410 assigns one or more calculator APs 440 from the available APs 110. In one embodiment, the controller AP 410 assigns one of the APs 110 as the calculator AP 440 based on available processor and/or memory capabilities of the available APs. In another embodiment, the controller AP 410 assigns two or more of the APs as calculator APs 440 based on available processor and/or memory capabilities of the available APs.

The calculator APs 440 perform one or more of the RRM algorithms, the channel calculations, the transmission power calculations, and the radio role calculations, among others. The controller AP 410 may assign multiple functions to a single calculator AP 440 when an AP 110 is determined to be able to perform multiple functions (e.g., the processor capabilities of the calculator AP 440 support performing multiple functions). The controller AP 410 assigns the role of calculator AP 440 to one or more the APs 110 as well as the function that each calculator AP 440 performs. The calculator APs 440 performs the RRM algorithms, channel calculations, transmission power calculations, and radio role calculations based on the telemetry data stored within the distributed cache 120. For example, the calculator APs 440 may access the telemetry data 310 stored within the distributed cache 120, perform the corresponding calculations, and store the results in the distributed cache 120. In one or more embodiments, a first one or more of the RRM algorithms, channel calculations, transmission power calculations, and radio role calculations may be assigned to a first calculator AP 440 and a second one or more of the RRM algorithms, channel calculations, transmission power calculations, and radio role calculations may be assigned to a second calculator AP. Additionally, or alternatively, the network controller 210 or the cloud computing system 220 may complete one or more of a first one or more of the RRM algorithms, channel calculations, transmission power calculations, and radio role calculations not assigned to a calculator AP 440. In one embodiment, the AP 110d is assigned as a calculator AP 440 and performs RRM algorithms, the AP 110e is assigned as a calculator AP 440 and performs channel calculations, and AP 110f is assigned as a calculator AP 440 and performs transmission power calculations and/or radio role calculations. In embodiments where multiple calculator APs 440 are selected by the controller AP 410, the calculator APs may perform the corresponding functions in parallel.

At operation 560, the calculator APs 440 assign network resources to the APs 110. For example, a calculator AP 440 assigns network resources according to the ranking determined by the ranker AP 420. In one embodiment, the calculator AP 440 accesses the AP ranking data 316 stored within the distributed cache, determines the highest ranked AP, and assigns network resources stored within resource allocation data 314 to the highest ranked AP. In one embodiment, the AP 110b is the highest ranked AP and is assigned a corresponding channel, channel bandwidth, and transmission power to ensure that the AP 110b receives network resources that are more optimal than that assigned to lower ranked APs 110. The calculator APs 440 then assigns network resources to each subsequently ranked AP such that the network resources are assigned to the lowest ranked APs last and the lowest ranked APs receive the least optimal network resources.

In one embodiment, a calculator AP 440 is employed as a channel calculator and measures the total amount of channel spectrum resource collected by the resource manager AP 430 and distributes it to each AP based on the channel spectrum requirements of each AP. In one or more embodiments, when the total amount of channel spectrum resource requirements of the APs 110 is over the total available allocation for the network, the calculator AP 440 determines the most starving one of the APs and does not allocate channel spectrum to the AP determined to be most starving. The remaining channel spectrum is allocated to the remaining APs. For example, channel 36 is determined to 40% available and channel 40 is determined to be 100% available. In such an example, the AP 110a is determined to require 20 MHz 100% clean channel. Accordingly, the calculator AP 440 assigns channel 40 to the AP 110a. In one or more embodiments, the channel 100 and channel 104 40 MHz are determined to be 50% available, accordingly, the calculator AP 440 assigns the channel 100 and the channel 104 to the APs determined to have similar resource requirements.

In one or more embodiments, a calculator AP 440 is employed as a transmitter power calculator configured to measure the total density and transmitter power energy strength of the network based on the number of the APs 110, the total transmitter power amount, and average received signal strength indicator (RSSI) strength in the network (e.g., the network of the network system 100). For example, when the network of the network system 100 is a high density radio frequency (RF) network, the transmitter power calculator assigns transmitter power to the AP that are determined to have higher transmitter power needs before transmitter power is assigned to other APs. For example, an AP determined to need high power may be an AP deployed proximate a corner of a room, an AP connected to weak signal clients and/or to which roaming clients are connected. In embodiments, when the transmitter power of an a first AP is increased, the transmitter power of one or more surrounding APs is reduced to reduce the co-channel contention between the APs and/or unnecessary coverage by over saturated transmitted power to save energy.

In one or more embodiments, a calculator AP 440 is employed as a radio role calculator configured to detect redundant APs. Redundant APs may be converted to a monitor role when the coverage area of a redundant AP is overlapped by other APs. In various embodiments, redundant APs are determined to have no client serving history or less client supporting then the other APs. Transitioning APs determined to be redundant to monitor roles reduces channel contention within the network as APs having overlapping coverage areas is reduced.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A network system comprising:
a plurality of access points (APs); and
a distributed cache formed from a portion of a memory in each AP of the plurality of APs, wherein the plurality of APs are configured to measure telemetry data and store the telemetry data in the distributed cache, and
wherein a first AP of the plurality of APs is assigned as a controller AP, the controller AP is configured to assign, based on the telemetry data stored in the distributed cache, multiple APs of the plurality of APs to different roles to analyze the plurality of APs and update resource configurations of the plurality of APs, wherein assigning the multiple APs of the plurality of APs to the different roles comprises:
  assigning, based on the telemetry data stored in the distributed cache, a second AP of the plurality of APs as a ranker AP configured to rank the plurality of APs; and
  assigning a third AP of the plurality of APs as a resource manager configured to determine radio resource information for the plurality of APs based on the telemetry data and store the radio resource information in the distributed cache.

2. The network system of claim 1, wherein the telemetry data comprises operating parameters, and each of the plurality of APs are configured to periodically store the telemetry data in the distributed cache.

3. The network system of claim 1, wherein the ranker AP is configured to rank the plurality of APs based on one or more factors for each of the plurality of APs.

4. The network system of claim 3, wherein the one or more factors comprises a resource requirement and a network throughput quality contribution score.

5. The network system of claim 4, wherein each of the plurality of APs is configured to:
  determine a respective resource requirement based on a channel bandwidth, bandwidth requirements of an associated client, radar tolerance, and latency sensitivity of the associated client;
  determine a respective network throughput quality contribution score based on a radio capability and a processor capability; and
  store the resource requirement and quality contribution score in the distributed cache.

6. The network system of claim 1, wherein
  determining the radio resource information for the plurality of APs comprises determining radio resource information for each of the plurality of APs based on the telemetry data; and
  storing the radio resource information in the distributed cache comprises storing the radio resource information for each of the plurality of APs in the in the distributed cache.

7. The network system of claim 1, wherein assigning the multiple APs of the plurality of APs to the different roles further comprises assigning a fourth AP of the plurality of APs as a calculator configured to assign network resources to each of the plurality of APs based on the ranking of the plurality of APs and the radio resource information for each of the plurality of APs.

8. A method for assigning radio resources to a plurality of access points (APs) comprises:
  storing telemetry data measured by each of the plurality of APs in a distributed cache, the distributed cache formed from a portion of a memory in each AP of the plurality of APs;
  selecting, using the plurality of APs, a first AP of the plurality of APs as a controller AP; and
  assigning, based on the telemetry data stored in the distributed cache, multiple APs of the plurality of APs different roles to analyze the plurality of APs and update resource configurations of the plurality of APs, wherein assigning the multiple APs of the plurality of APs to the different roles comprises:
    assigning, based on the telemetry data stored in the distributed cache, a second AP of the plurality of APs as a ranker AP configured to rank the plurality of APs; and
    assigning a third AP of the plurality of APs as a resource manager configured to determine radio resource information for the plurality of APs based on the telemetry data and store the radio resource information in the distributed cache.

9. The method of claim 8, wherein the telemetry data comprises operating parameters for each of plurality of APs.

10. The method of claim 8, wherein the ranker AP is configured to rank the plurality of APs based on one or more factors for each of the plurality of APs.

11. The method of claim 10, wherein the one or more factors comprises a resource requirement and a network throughput quality contribution score.

12. The method of claim 11, wherein the method further comprises:
  determining, by each of the plurality of APs, a respective resource requirement based on a channel bandwidth, bandwidth requirements of an associated client, radar tolerance, and latency sensitivity of the associated client;
  determining, by each of the plurality of APs, a respective network throughput quality contribution score based on a radio capability and a processor capability; and
  storing, by each of the plurality of APs, the resource requirement and the network throughput quality contribution score in the distributed cache.

13. The method of claim 8, wherein
  determining the radio resource information for the plurality of APs comprises determining radio resource information for each of the plurality of APs based on the telemetry data; and
  storing the radio resource information in the distributed cache comprises storing the radio resource information for each of the plurality of APs in the in the distributed cache.

14. The method of claim 8, wherein assigning the multiple APs of the plurality of APs to the different roles further comprises assigning a fourth AP of the plurality of APs as a calculator configured to assign network resources to each of the plurality of APs based on the ranking of the plurality of APs and the radio resource information for each of the plurality of APs.

15. An access point (AP) comprising:
  a processor configured to:
    measure telemetry data and store the telemetry data in a distributed cache formed from a portion of a memory in each AP of a plurality APs; and
    select a first AP of a plurality of APs as a controller AP, wherein the controller AP is configured to assign, based on the telemetry data stored in the distributed cache, multiple APs of the plurality of APs to different roles to analyze the plurality of APs and update resource configurations of the plurality of APs, wherein assigning the multiple APs of the plurality of APs to the different roles comprises:
      assigning, based on the telemetry data stored in the distributed cache, a second AP of the plurality of APs as a ranker AP configured to rank the plurality of APs; and
      assigning a third AP of the plurality of APs as a resource manager configured to determine radio resource information for the plurality of APs based on the telemetry data and store the radio resource information in the distributed cache.

16. The AP of claim 15, wherein the ranker AP is configured to rank the plurality of APs based on one or more factors for each of the plurality of APs.

17. The AP of claim 16, wherein the one or more factors comprises a resource requirement and a quality contribution score.

18. The AP of claim 17, wherein the ranker AP is further configured to:
   determine a respective resource requirement based on a channel bandwidth, bandwidth requirements of an associated client, radar tolerance, and latency sensitivity of the associated client;
   determine a respective network throughput quality contribution score based on a radio capability and a processor capability; and
   store the resource requirement and network throughput quality contribution score in the distributed cache.

19. The AP of claim 15, wherein
   determining the radio resource information for the plurality of APs comprises determining radio resource information for each of the plurality of APs based on the telemetry data; and
   storing the radio resource information in the distributed cache comprises storing the radio resource information for each of the plurality of APs in the in the distributed cache.

20. The AP of claim 15, wherein the controller AP is further configured to assign a fourth AP of the plurality of APs as a calculator configured to assign network resources to each of the plurality of APs based on the ranking of the plurality of APs and the radio resource information for each of the plurality of APs.

* * * * *